(12) United States Patent
Chan et al.

(10) Patent No.: US 7,634,200 B2
(45) Date of Patent: Dec. 15, 2009

(54) METHOD AND APPARATUS FOR TRANSPORTING ETHERNET AND RADIO FREQUENCY SIGNALS IN FIBER-OPTIC SYSTEM

(75) Inventors: Yi-Jen Chan, Jhongli (TW); Hsin-Pin Wang, Tucheng (TW); Fan-Hsiu Huang, Danshuel Township, Taipei County (TW); Dong-Ming Lin, Sijhou Township, Changhua County (TW); Jia-Wei Chen, Taipei (TW)

(73) Assignee: National Central University, Jhongli, Taoyuan (TW)

( * ) Notice: Subject to any disclaimer, the term of this patent is extended or adjusted under 35 U.S.C. 154(b) by 644 days.

(21) Appl. No.: 11/158,075

(22) Filed: Jun. 22, 2005

(65) Prior Publication Data

US 2006/0291863 A1    Dec. 28, 2006

(51) Int. Cl.
H04B 10/04 (2006.01)
(52) U.S. Cl. .................................. 398/185; 398/201
(58) Field of Classification Search ............... 398/185, 398/201
See application file for complete search history.

(56) References Cited

U.S. PATENT DOCUMENTS

| | | | | |
|---|---|---|---|---|
| 5,956,165 | A * | 9/1999 | Fee et al. | 398/78 |
| 6,108,113 | A * | 8/2000 | Fee | 398/16 |
| 6,763,193 | B1 * | 7/2004 | Chand et al. | 398/76 |
| 6,775,483 | B1 * | 8/2004 | Ikushima et al. | 398/186 |
| 6,879,640 | B1 * | 4/2005 | Agazzi | 375/295 |
| 7,274,872 | B2 * | 9/2007 | Bai | 398/30 |
| 2002/0048069 | A1 * | 4/2002 | Ibukuro | 359/154 |
| 2002/0131099 | A1 * | 9/2002 | Harasawa | 359/110 |
| 2004/0105686 | A1 * | 6/2004 | Lee et al. | 398/188 |
| 2006/0077612 | A1 * | 4/2006 | Kothari et al. | 361/115 |
| 2007/0166042 | A1 * | 7/2007 | Seeds et al. | 398/142 |

OTHER PUBLICATIONS

Shin, S. et al. "Optics layer protection of Gigabit-Ethernet system by monitoring optical signal quality." Electronics Letters, vol. 38, No. 19, Sep. 12, 2002: 1118-1119.*
Weik, Martin H. "Ethernet", "radio frequency". Fiber Optics Standard Dictionary. 3rd ed. 1997.*
Khanal, "Selective broadcasting of digital video signals over a WDM passive optical network".*
Lo, C.N. "A hybrid lightwave transmission system for subcarrier multiplexed video and digital B-ISDN services in the local loop". Journal of Lightwave Technology. Nov. 1989, vol. 7, No. 11: 1839-1848.*

(Continued)

Primary Examiner—Leslie Pascal
(74) Attorney, Agent, or Firm—Jackson IPG PLLC

(57) ABSTRACT

A single wavelength fiber-optic communication system that mixes an Ethernet signal with a radio frequency signal is disclosed. The system includes an Ethernet signal module, a radio frequency signal module, a mixer module and a receiver module. The Ethernet signal module provides an Ethernet signal. The radio frequency signal module provides a radio frequency signal. The mixer module provides an optical mixed signal by means of mixing the Ethernet signal with the radio signal at a single wavelength. The receiver module transforms the optical mixed signal into the radio frequency signal and a digital signal that contains the Ethernet signal.

14 Claims, 8 Drawing Sheets

OTHER PUBLICATIONS

Ramaswami, R. and K.N. Sivarajan. Optical Networks: A Practical Perspective. 2nd ed. San Francisco: Morgan Kaufmann Publishers, 2002.*

Rossi, G. et al. "Optical performance monitoring in reconfigurable WDM optical networks using subcarrier multiplexing". Journal of Lightwave Technology. Dec. 2000, vol. 18, No. 12: 1639-1648.*

Wang, H.P. et al. "A method of double optical modulation for direct combining Ethernet and video signals in optical network." Quantum Electronics and Laser Science Conference, 2005. QELS '05. May 22-27, 2005: 1681-1683, vol. 3.*

* cited by examiner

METHOD AND APPARATUS FOR TRANSPORTING ETHERNET AND RADIO FREQUENCY SIGNALS IN FIBER-OPTIC SYSTEM

BACKGROUND OF INVENTION

1. Field of Invention

The present invention relates to a method and apparatus for transporting Ethernet and radio frequency signals in a fiber-optic system.

2. Related Prior Art

In fiber-optic communication, to increase the utility rate of a fiber-optic and the convenience of exchange with a web, signals in different forms must be transmitted through the fiber-optic. Usually, this is done in one of the following ways:

A first solution is wavelength division multiplexing ("WDM"). WDM provides adequate differences between the wavelengths of the signals. Like frequency multiplexing, WDM prevents the interferences of signals in different forms at a same operative frequency (analog) or operative rate (digital). Thus, digital signals can be transmitted at a high bit rate.

A second solution is frequency division multiplexing ("FDM"). FDM uses different carries to separate signals in different forms. The bandwidth required for digital signals however increases as the bit rate increases. Hence, the differences between the frequencies of the signals must increase in order to avoid interferences, i.e., the amount of channels available in a fiber-optic decreases as the bit rate increases. Moreover, a M-ary phase-shift keying ("M-PSK") or multi-level quadrature amplitude modulation ("M-QAM") may be used to transform bits into symbols in order to generate a symbol rate of the digital signals so as to reduce the required bandwidth.

A third solution is light polarization quadrature multiplexing. The third solution uses a single wavelength to transmit two signals in different forms. To avoid the signals from interfering each other, the signals are carried on two quadrature polarizations of a single wavelength. Thus, a single wavelength can transmit two signals simultaneously.

However, the conventional solutions involve complicated fiber-optic communications, high costs or low bit rates of digital signals.

The present invention is therefore intended to obviate or at least alleviate the problems encountered in prior art.

SUMMARY OF INVENTION

According to the present invention, a single wavelength fiber-optic communication system that mixes an Ethernet signal with a radio frequency signal includes an Ethernet signal module, a radio frequency signal module, a mixer module and a receiver module. The Ethernet signal module provides an Ethernet signal. The radio frequency signal module provides a radio frequency signal. The mixer module provides an optical mixed signal by means of mixing the Ethernet signal with the radio signal at a single wavelength. The receiver module transforms the optical mixed signal into the radio frequency signal and a digital signal that contains the Ethernet signal.

An advantage of the system according to the present invention is that it renders a high bit rate of digital signals possible.

Another advantage of the system according to the present invention is that it involves a simple and inexpensive structure.

Other advantages and novel features of the invention will become more apparent from the following detailed description in conjunction with the drawings.

BRIEF DESCRIPTION OF DRAWINGS

The present invention will be described through detailed description of the preferred embodiment referring to the drawings.

DETAILED DESCRIPTION OF PREFERRED EMBODIMENT

Figure 1:
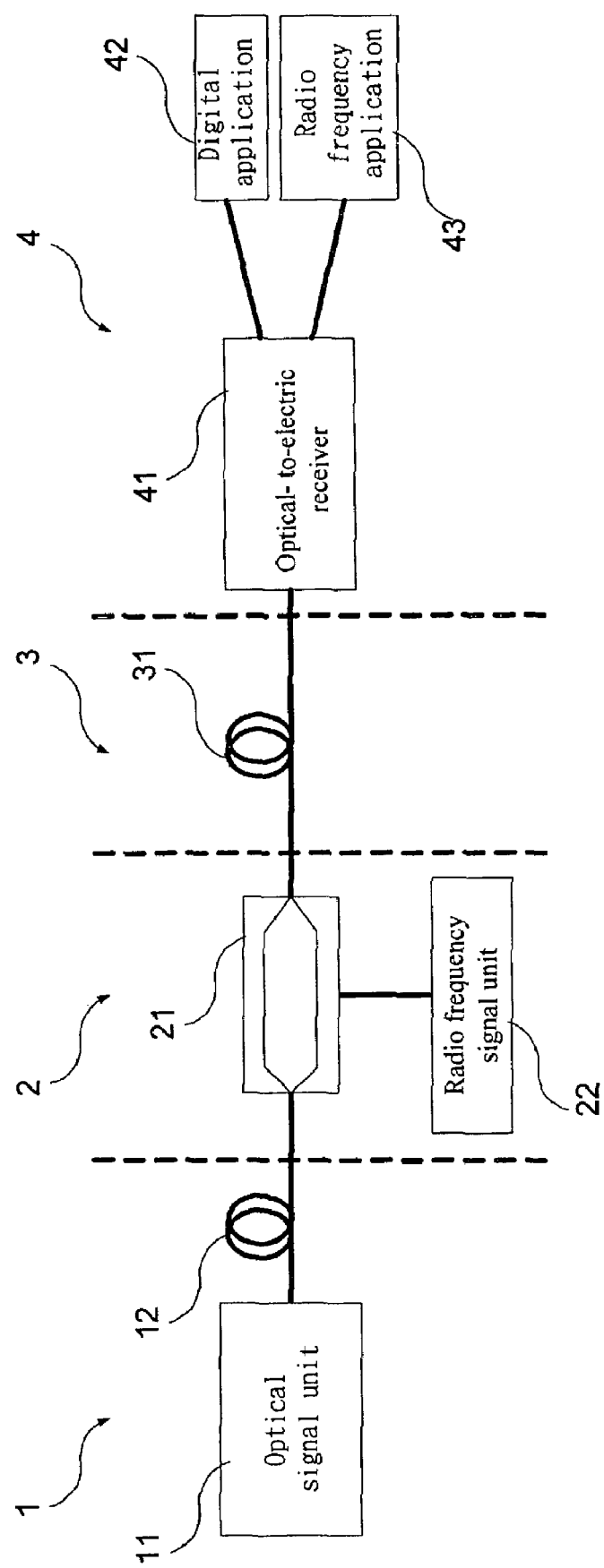
FIG. 1 is a block diagram of a system according to the preferred embodiment of the present invention.
Figure 2:
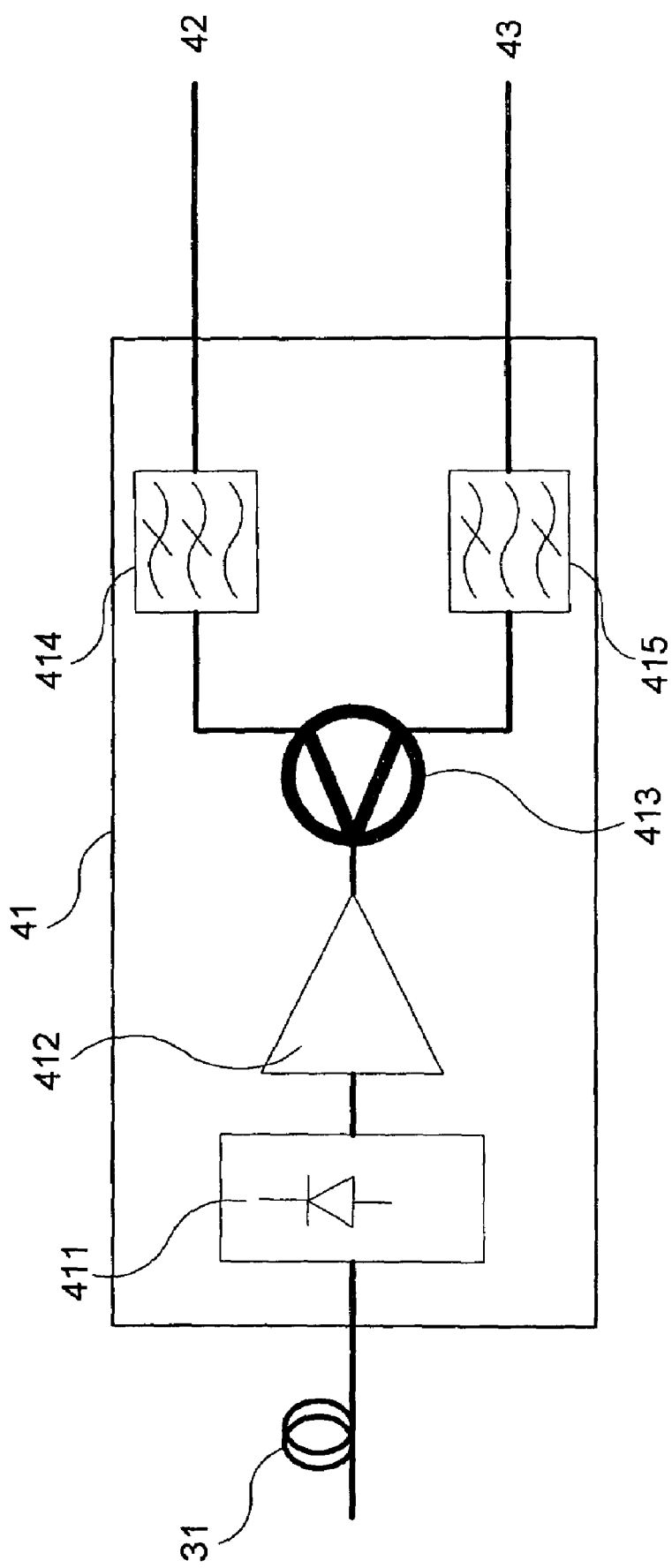
FIG. 2 is a block diagram of an electro-optical receiver used in the system shown in FIG. 1.

Referring to FIG. 1, there is shown a single-wavelength fiber-optic communication system that mixes an Ethernet signal with a radio frequency signal according to the preferred embodiment of the present invention. The system includes an optical Ethernet signal module 1, a mixer module 2, a transmitter module 3, and a receiver module 4. From the optical Ethernet signal module 1, an Ethernet signal in an optical form is transmitted to an optical input of the mixer module 2. A radio frequency signal is transmitted to a radio frequency input of the mixer module 2. In the mixer module 2, the Ethernet signal is mixed with the radio frequency signal. From an output of the mixer module 2 is transmitted a mixed signal in an optical form.

Figure 3:
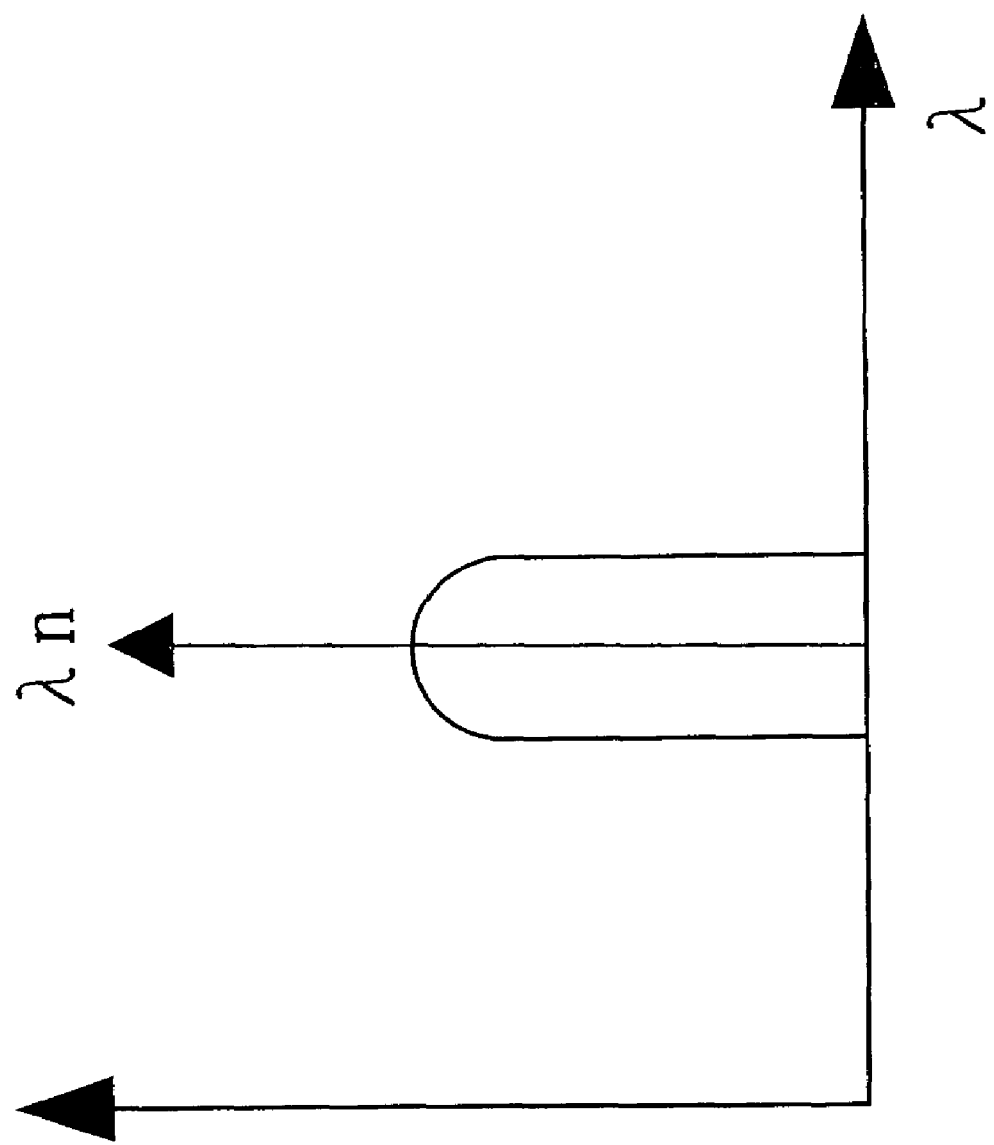
FIG. 3 shows a spectrum of a directly modulated digital optical signal before it enters a Mach-Zehnder modulator.

The optical Ethernet module 1 may generate the Ethernet signal or receive the Ethernet signal from an upper layer. The optical Ethernet module 1 includes an optical signal unit 11 and a fiber-optic 12 connected with the optical signal unit 11. The optical signal unit 11 provides a directly modulated signal, i.e., the Ethernet signal (FIG. 3). The Ethernet signal may come from any optical modulator such as a Mach-Zehnder optical modulator ("MZM") and electro-absorption modulator ("EAM"), a laser diode ("LD"), or an external optical web. The laser diode may be any existing laser diode for optical communication with a wavelength of 850 nm, 1310 nm or 1550 nm. The fiber-optic 12 may be a single mode fiber ("SMF") or a polarization mode fiber ("PMF").

Figure 4:
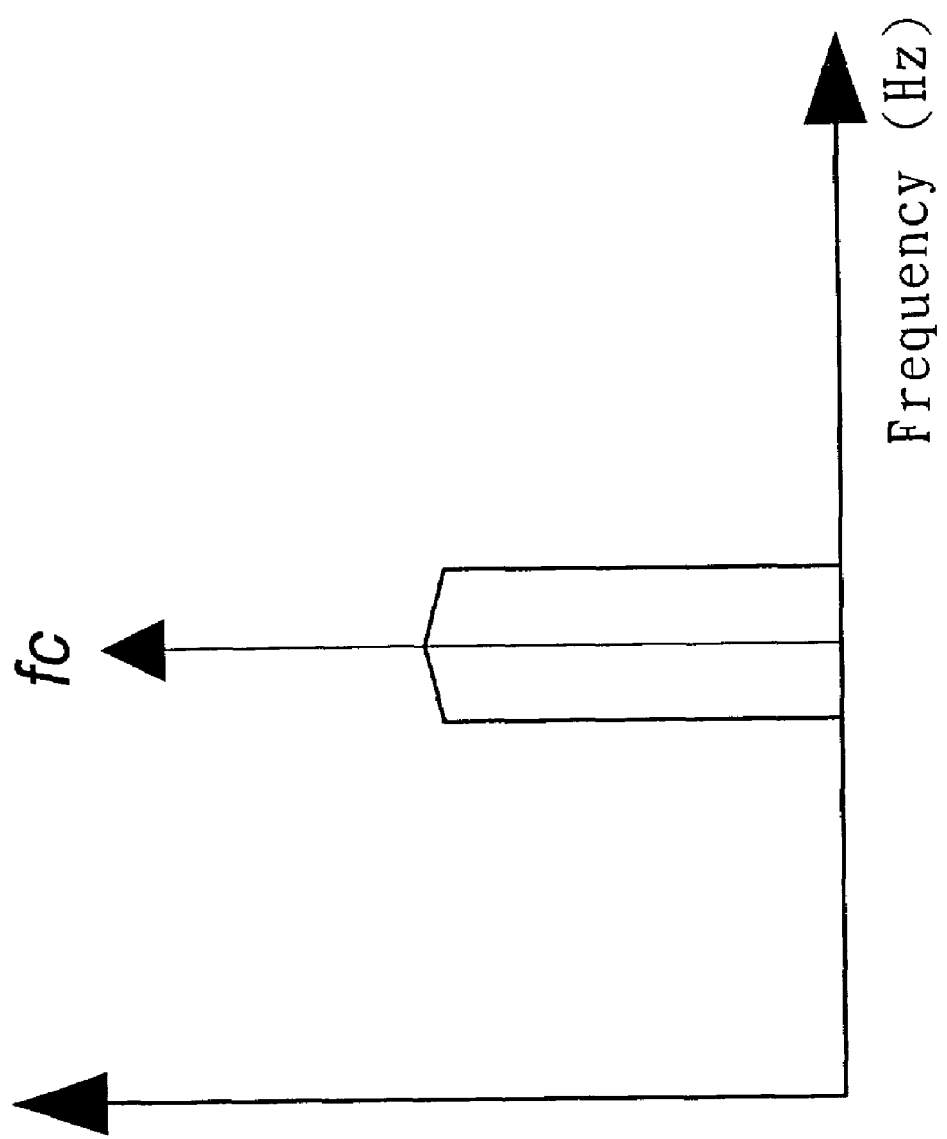
FIG. 4 is similar to FIG. 3 but shows a spectrum of the directly modulated digital optical signal before the Mach-Zehnder modulator is actuated.

The mixer module 2 generates the electric radio frequency signal and then mixes the same with the Ethernet signal in order to provide a single-wavelength mixed signal (FIG. 4).

The mixer module 2 includes a Mach-Zehnder electric-to-optic modulator ("MZM") 21 connected to the fiber-optic 12 and an electric radio frequency signal unit 22 connected to the MZM 21. The MZM 21 includes an optical input for receiving the Ethernet signal from the fiber-optic 12, an optical output for providing the mixed signal in the optical form to the transmitter module 3, a direct current voltage input for receiving a direct current voltage ("$V_{bias}$"), and an electric radio frequency signal input for receiving the radio frequency signal ("$V_{RF}$", not shown). The electric radio frequency signal unit 22 provides a modulated signal with a carrier, i.e., the radio frequency signal.

The transmitter module 3 transmits the mixed signal to an external web from the mixer module 2. The transmitter module 3 includes a fiber-optic 31 connected to the MZM 21. The fiber-optic 31 may be a SMF or PMF.

Figure 5:
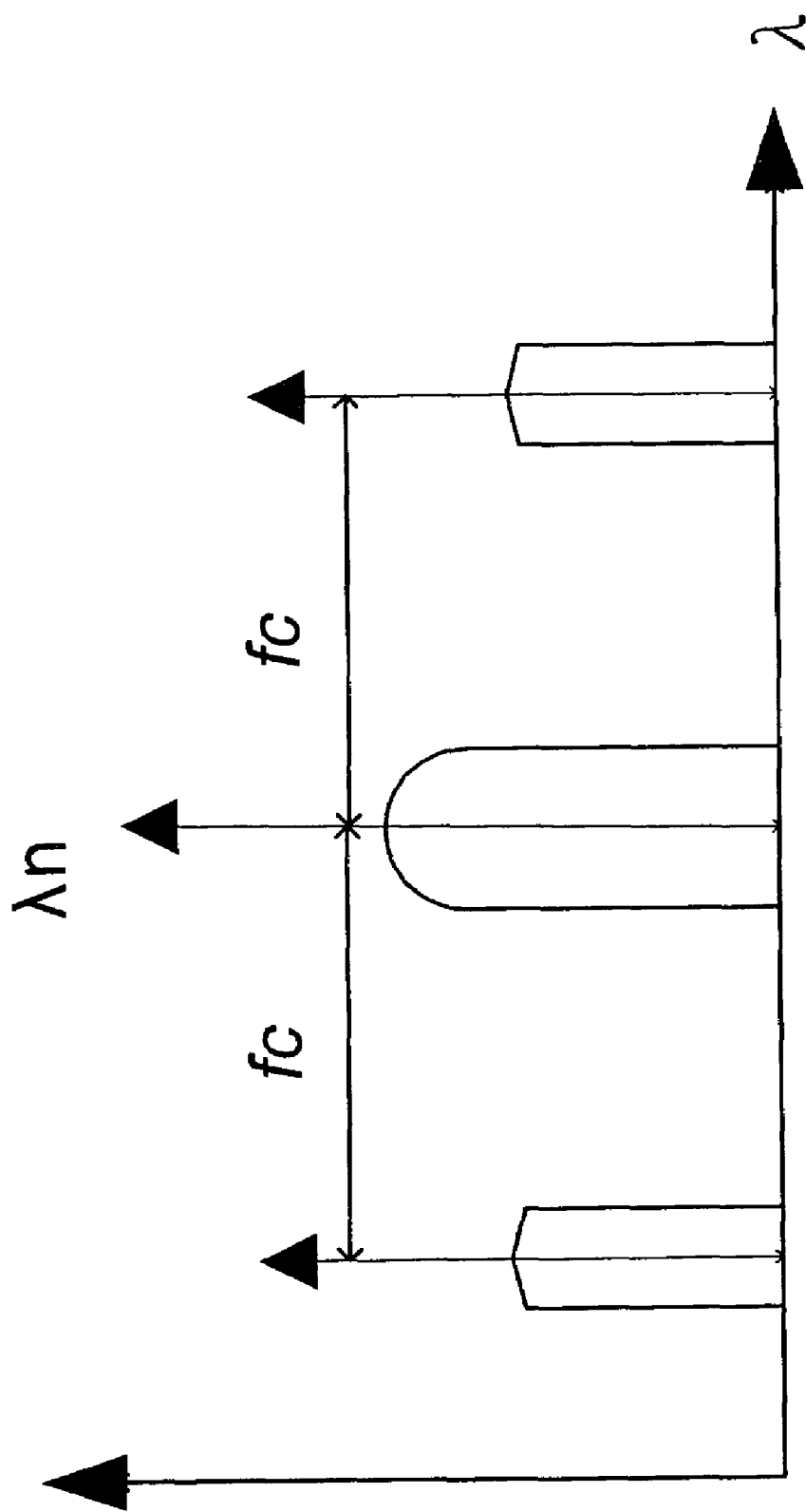
FIG. 5 shows a spectrum of digital and radio frequency signals modulated twice at outputs of the Mach-Zehnder modulator.

The receiver module 4 receives the single-wavelength mixed signal from the transmitter module 3, and then transforms the same into two signals independent of each other, and then transmits the signals to different applications (FIG. 5). Dependent on the bandwidths of the system and the circuit, the signals are transmitted at 100 Mb/s to 10 Gb/s. The digital signal can be transmitted at 1.25 Gb/s. The frequency of the carrier of the radio frequency signal is higher than 1.875 GHz.

The receiver module 4 includes an optic-to-electric receiver 41 connected to the fiber-optic 31, a digital application 42 connected to the optic-to-electric receiver 41, and a radio frequency application 43 connected to the optic-to-electric receiver 41.

The optic-to-electric receiver 41 includes photodiode 411 connected to the fiber-optic 31, an amplifier 412 connected to the photodiode 411, a power splitter 413 connected to the amplifier 412, a low-pass filter 414 provided between the power splitter 413 and the digital application 42, and a band-pass filter 415 provided between the power splitter 413 and the radio frequency application.

The photodiode 411 receives the mixed signal in the optical form from the fiber-optic 31, and transforms the same into an electric form. The photodiode 411 may be a semi-conductor such as a PIN (p-intrinsic-n), APD (avalanche photodetector) and MSM (metal-semiconductor-metal).

The amplifier 412 receives the mixed signal from the photodiode 411, and amplifies the same in order to provide an amplified mixed signal in an electric form. The amplifier 412 may be a trans-impedance amplifier or an ordinary amplifier.

Figure 6:
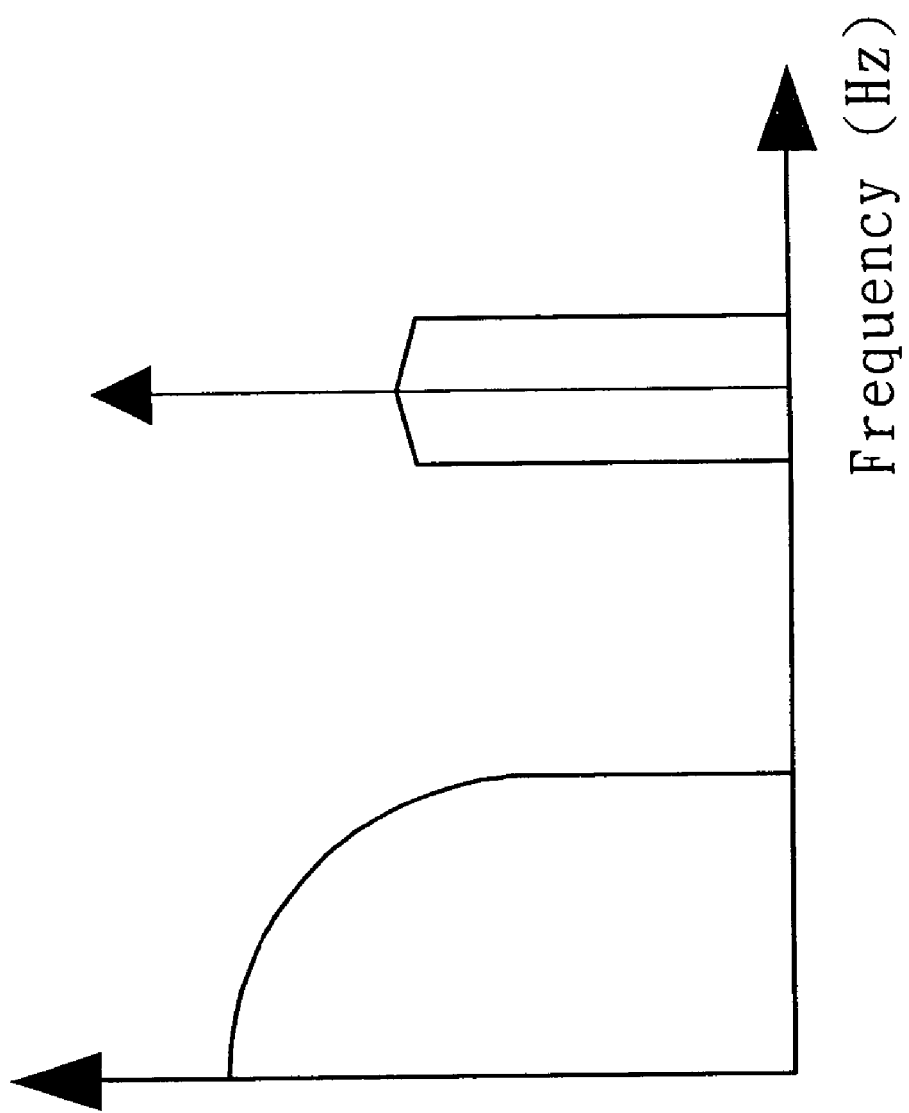
FIG. 6 shows a spectrum at an optic-to-electric receiver used in the system of the present invention.

The power splitter 413 receives the amplified mixed signal from the amplifier 412, and then splits the same into a first analog/digital signal and a second analog/digital signal (FIG. 6). In the preferred embodiment, the first analog/digital signal is identical to the first analog/digital signal; however, they are not necessarily identical. The power splitter 413 is designed based on the transmission cable theory and made on a printed circuit board. The carrier of the frequency increasing and reducing digital signal is the designed central frequency. Based on the direction, a Wilkinson power divider, a 90/180° hybrid and a coupler can be used alone or in any combination.

The low-pass filter 414 receives the first analog/digital signal from the power splitter 413 in order to provide a digital signal to the digital application 42. The low-pass filter 414 may be made of a surface mount device ("SMD"), a stepped/coupled transmission cable, a combination of a SMD with a transmission cable, or any other appropriate design.

The digital signal may be processed by means of a high-pass filter (not shown) and a mixer (not shown) in order to recover the Ethernet signal in a packet. The Ethernet signal in the packet may be processed by means of another low-pass filter (not shown) in order to recover the Ethernet signal not in a packet. Then, the Ethernet signal may be amplified by means of a limiting amplifier (not shown).

The band-pass filter 415 receives the second analog/digital signal from the power splitter 413.

Figure 7:
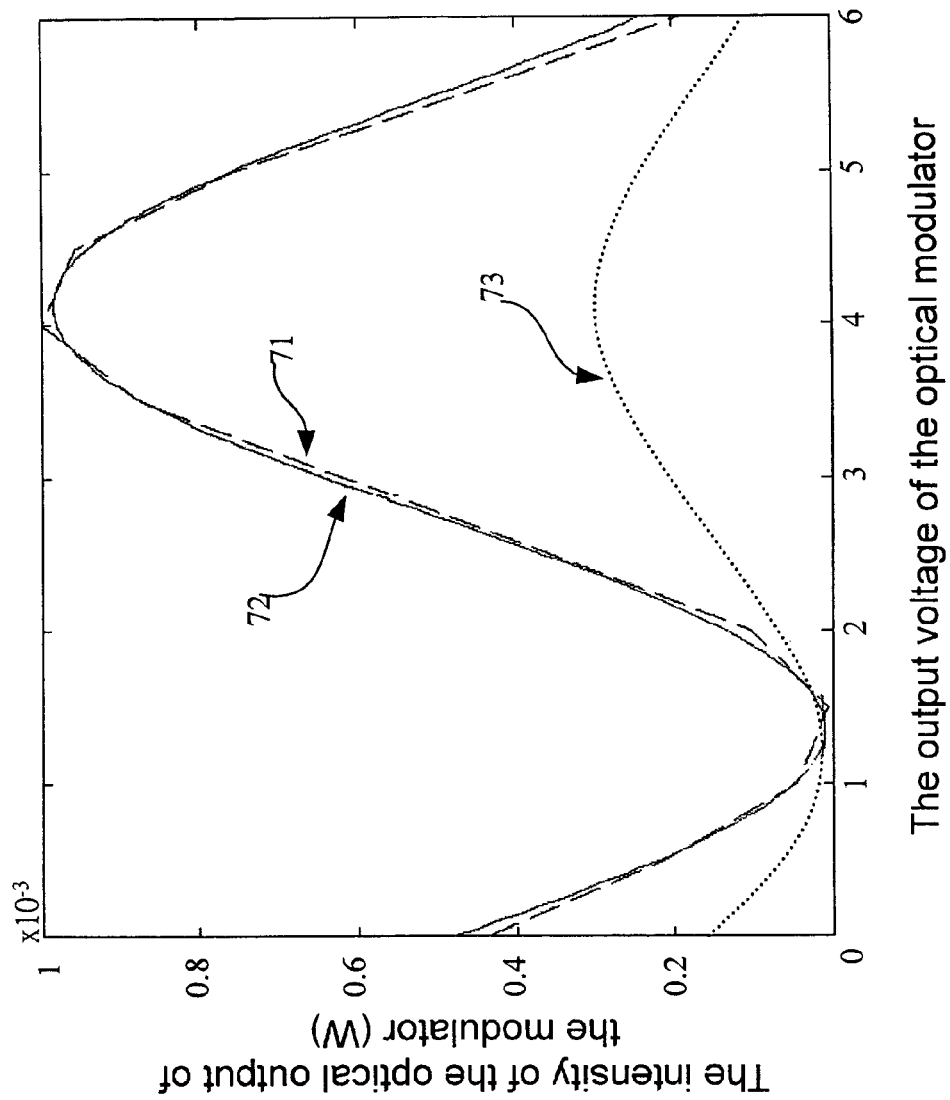
FIG. 7 shows a curve of the properties of a Mach-Zehnder modulator used in the system of the present invention.
Figure 8:
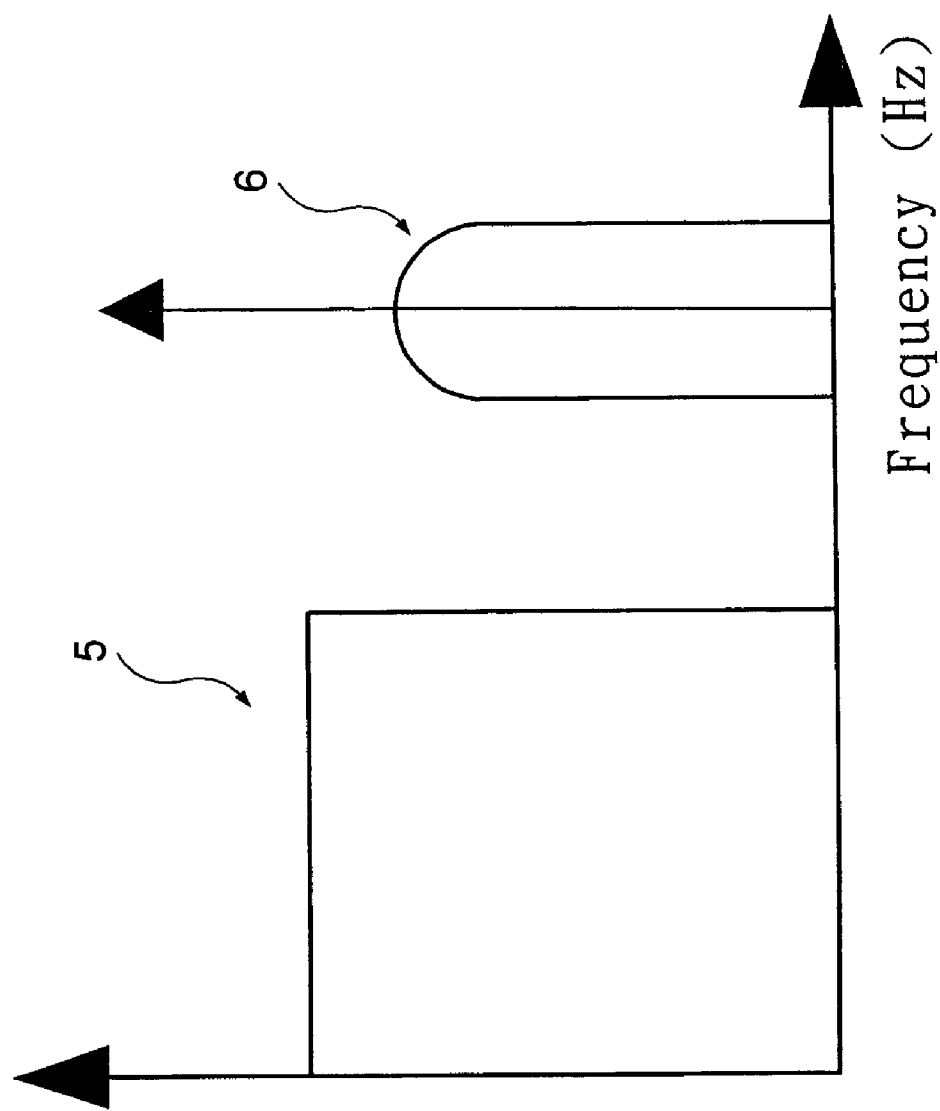
FIG. 8 shows a spectrum at an optical input and an electric input of Mach-Zehnder modulator shown in FIG. 7.

Referring to FIGS. 7 and 8, two spectrums at the optical and electric inputs of the MZM 21 are shown. As shown in FIG. 7, "71 represents a curve of large signals measured in the MZM 21, and "72 represents a mold based on the curve 71, and "73 represents a mold built regarding a changing $I_{opt}$. As the demands for high-speed web service are growing, there is a growing trend to combine a radio frequency signal 6 with an Ethernet/Internet signal. In a conventional fiber-optic transmission system, to transmit a digital signal 5 and the radio frequency signal 6 through a same fiber-optic, they are carried on different wavelengths. However, a system must include two stable laser diodes, two optical couplers and two optical filters. The capacity of transmission depends on the qualities of these elements. Hence, the system includes a complicated structure and involves a high cost. To facilitate the combination of the RF signal with the Ethernet signal and not modify the system or add equipment to the system, the combination of the RF signal with digital signal is conducted by means of mixing these signals with each other and then transmitting them at a single wavelength in a limited bandwidth.

In the present invention, the MZM 21 is used. The large signal model of the MZM 21 is expressed in the following equation:

$$I_{out}(V_a, I_{opt}) = \tfrac{1}{2} \times I_{opt}(t)[1-\cos(\pi V_a(t)/V_\pi + \Phi)]$$

$I_{out}$ represents the intensity of light at the output of the MZM 21 as a function of a voltage $V_a$. The voltage $V_a$ is the signal that drives the MZM 21 and includes a bias point and the RF signal. $I_{opt}$ represents the intensity of light at the optical input of the MZM 21 and is a function of time in the single wavelength application according to the present invention instead of a constant in the prior art. $V_\pi$ represents a half-wavelength voltage. $\Phi$ represents a static phase shift. The last two variants suggest that the properties of the MZM 21 are constant and do not change from application to application.

As shown in the spectrum of FIG. 8, by means of the optical and electric inputs of the MZM 221, two different signals are carried on a same wavelength and then the received signals are transformed to the spectrum of the electric signals. The bandwidth of the spectrum of the digital signal 5 increases as the bit rate increases. Therefore, to carry the radio frequency signal 6 in an available frequency band, the frequency of the radio frequency signal 6 must be far from the bit rate of the digital signal 5. Provided that the signal-noise ratio ("SNR") exerted on the radio frequency signal 6 by the digital signal 5 is in an acceptable range and that the binary error rate ("BER") of the digital signal 5 is not affected by the radio frequency signal 6, the power of the digital signal 5 and the power and frequency of the radio frequency signal 6 must be optimized based on the demands for the signals and the conditions of the MZM 21 and the optic-to-electric receiver 41.

According to different types of modulation, the radio frequency 6 includes demands for the digital signal 5. Based on different standards such as SONET OC-n (n=1, 2, 3) and SHD STM-m (m=1, 2, 3), a directly modulated digital optical signal usually includes different signal types such as NZ and NRZ. There are different demands for the power intensities of the two signals and the frequency of the radio frequency signal 6. The optimization is conducted based on the electric signals after the inputs.

Conclusively, the problems encountered in the prior art are eliminated by the single wavelength fiber-optic transmission system that mixes an Ethernet signal with a radio frequency signal. According to the present invention, the properties of the two signals are combined in the single wavelength fiber-optic transmission system. Thus, the cores of the Ethernet and radio frequency systems are simplified. Without the need of making significant modifications to the conventional transmission systems, the capacity of transmission is increased so that system operators can provide multiple services.

The present invention has been described through the detailed description of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A single wavelength fiber-optic communication system that mixes an Ethernet signal with a radio frequency signal, the system comprising: an Ethernet signal module (1) for providing an Ethernet signal; a radio frequency signal module (21) for providing a radio frequency signal; a mixer module (2) for providing an optical mixed signal by means of mixing the Ethernet signal with the radio signal at a single wavelength; and a receiver module (4) for transforming the optical mixed signal into both the radio frequency signal and a digital signal that contains the Ethernet signal, wherein the receiver module (4) comprises: an optic-to-electric receiver (41) for transforming the optical mixed signal into the digital signal and the radio frequency signal; a digital application (42) for receiving the digital signal; and a radio frequency application (43) for receiving the radio frequency signal, wherein the optic-to-electric receiver (41) comprises: a photodiode (411) for transforming the optical mixed signal into an electric mixed signal; an amplifier (412) for amplifying the electric mixed signal; a power splitter (413) for splitting the amplified electric mixed signal into a first portion and a second portion; a low-pass filter (414) for transforming the first portion of the amplified electric mixed signal into the digital signal; and a band-pass filter (415) for transforming the second portion of the amplified electric mixed signal into the radio frequency signal, wherein the Ethernet signal module (1) comprises an optical signal unit (11) for providing the Ethernet signal in an optical form, wherein the mixer module (2) comprises a Mach-Zehnder electric-to-optic modulator (21), wherein both the Ethernet signal in the optical form and the radio frequency signal are directly modulated by the Mach-Zehnder electric-to-optic modulator (21).

2. The system according to claim 1 wherein the amplifier (412) is a trans-impedance amplifier.

3. The system according to claim 1 wherein the power splitter (413) is any combination of a Wilkinson power divider, a 90°/180° hybrid, and a coupler.

4. The system according to claim 1 wherein the low-pass filter (414) is made of any combination of a surface mount device and a stepped/coupled transmission line.

5. The system according to claim 1 wherein the optical signal unit (11) is selected from a group consisting of a Mach-Zehnder modulator and a laser diode.

6. The system according to claim 5 wherein the laser diode is operated at a wavelength selected from a group consisting of 850 nm, 1310 nm and 1550 nm.

7. The system according to claim 1 wherein the Ethernet signal module (1) receives the Ethernet signal in the optical form from an external element.

8. The system according to claim 1 comprising a fiber-optic (12) for transmitting the Ethernet signal in the optical form to the mixer module (2) from the Ethernet signal module (11).

9. The system according to claim 8 wherein the fiber-optic (12) is selected from a group consisting of a single mode fiber and a polarization mode fiber.

10. The system according to claim 1 wherein the band-pass filter (415) is made of any combination of a surface mount device and a stepped/coupled transmission line.

11. The system according to claim 1 comprising a fiber-optic (31) for transmitting the optical mixed signal to the receiver module (4) from the mixer module (2).

12. The system according to claim 11 wherein the fiber-optic (31) is selected from a group consisting of a single mode fiber and a polarization mode fiber.

13. The system according to claim 1 wherein the first portion of the amplified electric mixed signal is identical to the second portion of the amplified electric mixed signal.

14. The system according to claim 13 wherein the semiconductor is selected from a group consisting of a PIN (p-intrinsic-n), APD (avalanche photodetector) and MSM (metal-semiconductor-metal).

* * * * *